United States Patent
Huang et al.

(10) Patent No.: US 10,921,865 B2
(45) Date of Patent: Feb. 16, 2021

(54) INPUT TOUCHPAD MODULE AND COMPUTING DEVICE HAVING A TOUCH MEMBER WITH IMPROVED SWINGING STABILITY

(71) Applicant: PRIMAX ELECTRONICS LTD., Taipei (TW)

(72) Inventors: Tai-Sou Huang, Taipei (TW); Shao-Ju Yen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/448,393

(22) Filed: Jun. 21, 2019

(65) Prior Publication Data

US 2020/0301471 A1    Sep. 24, 2020

(30) Foreign Application Priority Data

Mar. 22, 2019  (TW) .............................. 108110142 A (51) Int. Cl.
| | |
|---|---|
| *G06F 3/033* | (2013.01) |
| *G06F 1/16* | (2006.01) |
| *H01H 21/24* | (2006.01) |
| *G06F 3/0354* | (2013.01) |
| *H01H 21/12* | (2006.01) |

(52) U.S. Cl.
CPC .......... *G06F 1/169* (2013.01); *G06F 3/03547* (2013.01); *H01H 21/12* (2013.01); *H01H 21/24* (2013.01); *G06F 1/1616* (2013.01); *G06F 2203/04105* (2013.01)

(58) Field of Classification Search
CPC .... G06F 1/169; G06F 3/03547; G06F 1/1616; G06F 2203/04105; H01H 21/12; H01H 21/24

See application file for complete search history.

(56) References Cited

U.S. PATENT DOCUMENTS

| | | | |
|---|---|---|---|
| 2010/0079404 A1* | 4/2010 | Degner .................. | G06F 3/044 345/174 |
| 2014/0015754 A1* | 1/2014 | Chang ................. | G06F 3/03547 345/168 |
| 2015/0185779 A1* | 7/2015 | Doi ...................... | G06F 3/03547 361/679.1 |
| 2016/0081193 A1* | 3/2016 | Leggett ................. | G06F 1/1658 361/749 |

(Continued)

*Primary Examiner* — Adam J Snyder
(74) *Attorney, Agent, or Firm* — WPAT, PC (57) ABSTRACT

A touchpad module includes a touch member, a base plate, a switch, a supporting structure and a sheet-like elastic element. The base plate includes a triggering part. The switch is disposed on the touch member and aligned with the triggering part. The supporting structure is arranged between the base plate and the touch member. The sheet-like elastic element is located under the touch member and extended along an extension direction. The sheet-like elastic element includes plural vacant spaces. The plural vacant spaces are discretely arranged along the extension direction. The sheet-like elastic element is divided into a swinging structure and plural fixing structures by the plural vacant spaces. In response to an external force, the touch member is swung toward the base plate by using the supporting structure as a fulcrum, and the swinging structure is swung toward the base plate.

12 Claims, 9 Drawing Sheets

(56) References Cited

U.S. PATENT DOCUMENTS

| | | | |
|---|---|---|---|
| 2017/0045976 A1* | 2/2017 | Bushnell | G06F 3/044 |
| 2017/0052611 A1* | 2/2017 | Komatsu | G06F 3/03547 |
| 2017/0069444 A1* | 3/2017 | Wang | G06F 1/1662 |
| 2017/0140883 A1* | 5/2017 | Kitamura | H01H 13/10 |
| 2019/0258290 A1* | 8/2019 | Song | G06F 3/03547 |

* cited by examiner

INPUT TOUCHPAD MODULE AND COMPUTING DEVICE HAVING A TOUCH MEMBER WITH IMPROVED SWINGING STABILITY

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

Figure 1:
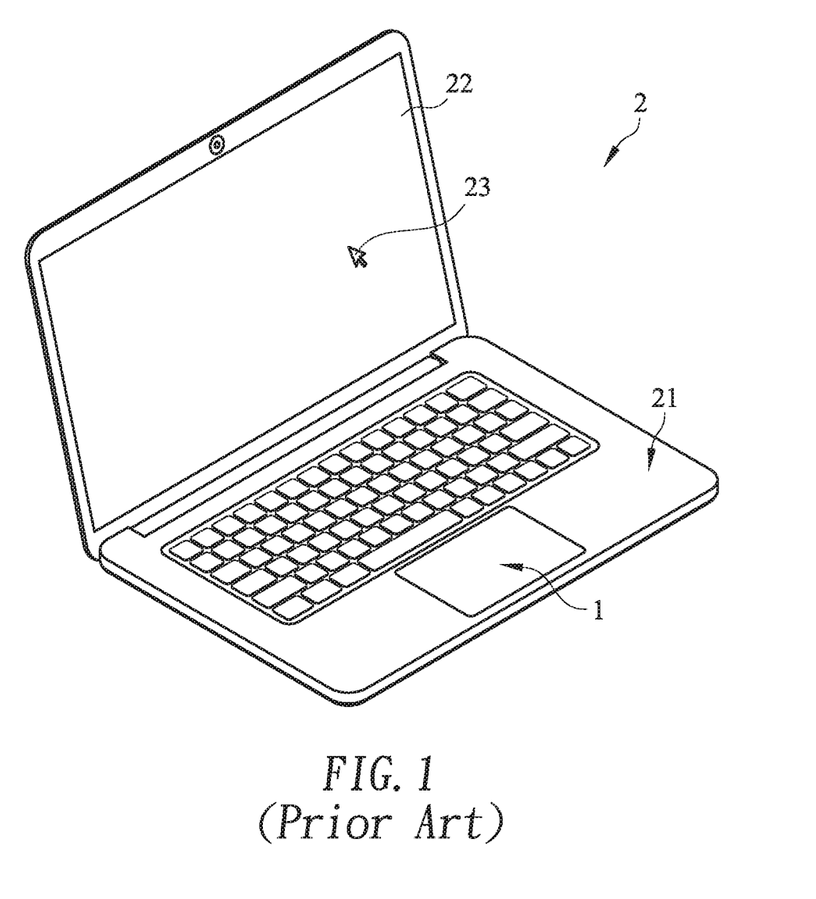
FIG. 1 schematically illustrates a conventional notebook computer with a touchpad module.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

Figure 2:
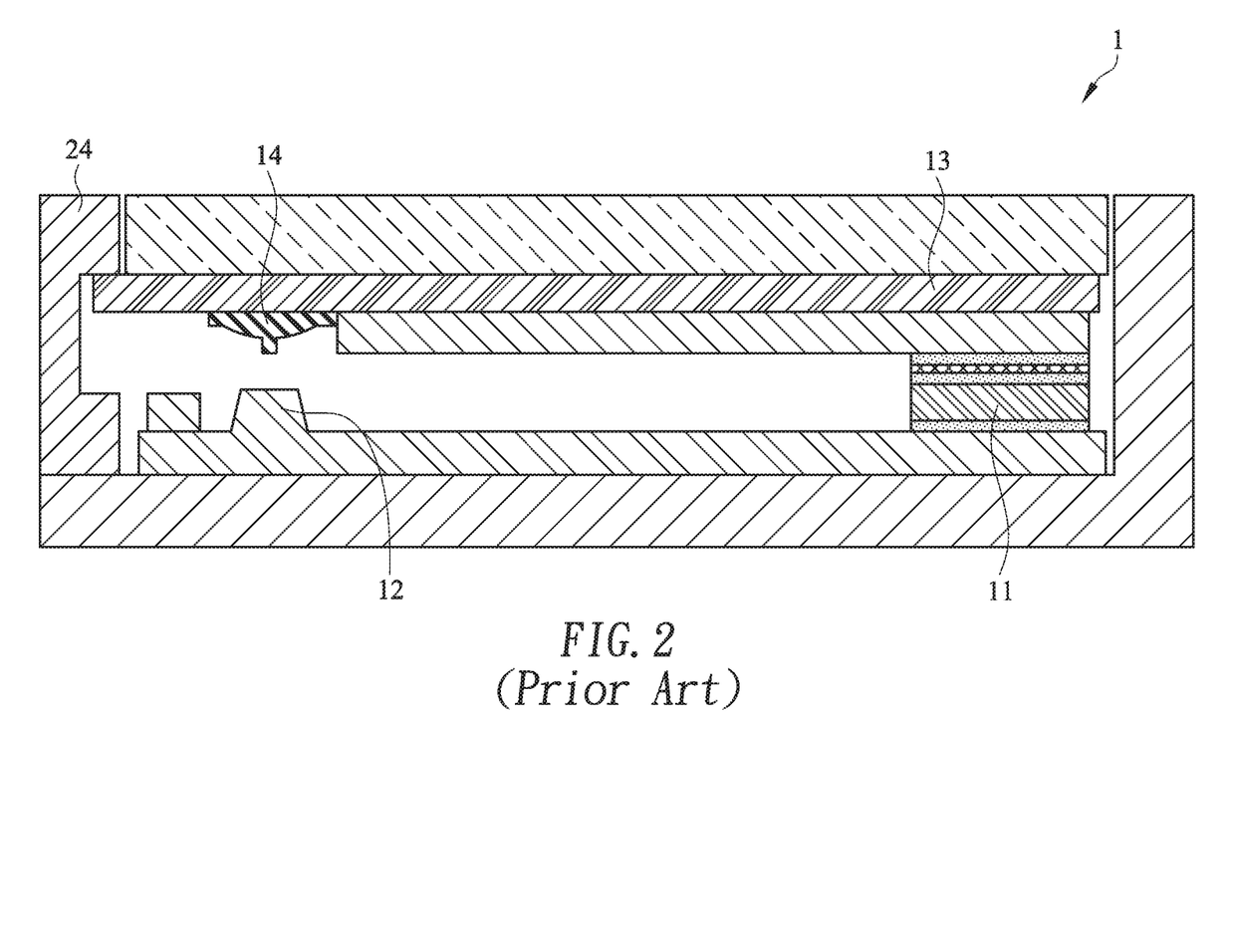
FIG. 2 is a schematic cross-sectional view illustrating the touchpad module as shown in FIG. 1, in which the touchpad module is not pressed down.
Figure 3:
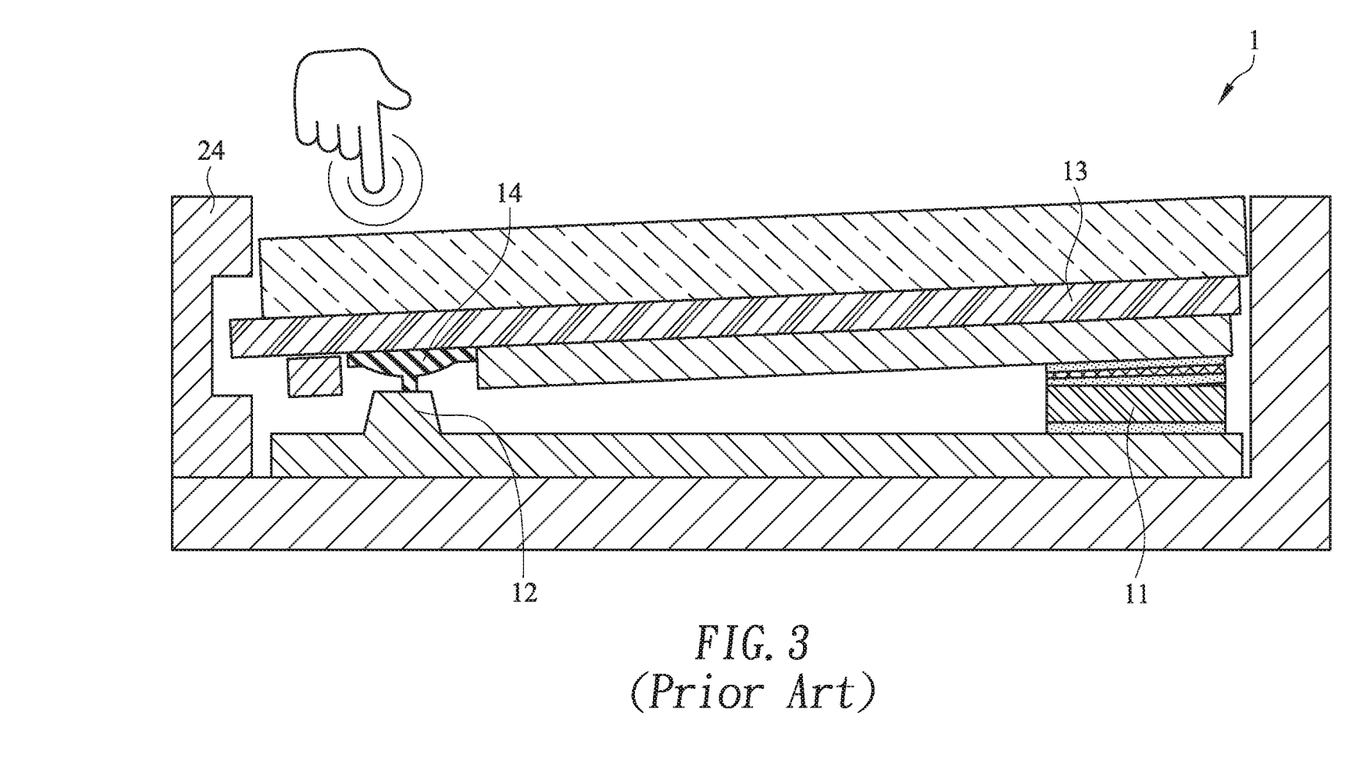
FIG. 3 is a schematic cross-sectional view illustrating the touchpad module as shown in FIG. 2, in which the touchpad module is pressed down.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in a casing 21 of the notebook computer 2. The touchpad module 1 is installed in the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 may be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

However, the conventional touchpad module 1 still has some drawbacks. For example, the supporting structure 11 is connected with the upper component and the lower component through iron elements or plastic structures (e.g., sponge structures). Consequently, as the iron elements or plastic structures are subjected to deformation, the touch member 13 can be swung upwardly or downwardly. Due to the design of the supporting structure 11, the upward/downward swinging action of the touch member 13 is usually aslant and unstable.

Therefore, there is a need of providing an improved touchpad module in order to overcome the above drawbacks.

SUMMARY OF THE INVENTION

An object of the present invention provides a touchpad module with a mechanism for increasing the swinging stability of a touch member.

Another object of the present invention provides a computing device with a touchpad module. The touchpad module includes a mechanism for increasing the swinging stability of a touch member.

The other objects and advantages of the present invention will be understood from the disclosed technical features.

In accordance with an aspect of the present invention, a touchpad module for a computing device is provided. The computing device includes a fixing frame. The touchpad module includes a touch member, a base plate, a switch, a supporting structure and a sheet-like elastic element. The touch member is disposed within the fixing frame. The touch member includes a first lateral side and a second lateral side, which are opposed to each other. The base plate is disposed within the fixing frame, and includes a triggering part. The base plate and the touch member are opposed to each other. The switch is disposed on the touch member and aligned with the triggering part of the base plate. The supporting structure is arranged between the base plate and the touch member. The sheet-like elastic element is located under the touch member and extended along an extension direction. The extension direction is in parallel with an extension line from the first lateral side of the touch member to the second lateral side of the touch member. The sheet-like elastic element includes plural vacant spaces. The plural vacant spaces are discretely arranged along the extension direction. The sheet-like elastic element is divided into a swinging structure and plural fixing structures by the plural vacant spaces. A bending line passes through junctions between the fixing structures and the swinging structure. When an external force is exerted on the touchpad module, the touch member is swung toward the base plate by using the supporting structure as a fulcrum, so that the switch is contacted with the triggering part. While the touch member is swung toward the base plate, the swinging structure is swung toward the base plate by using the bending line as the fulcrum.

When the external force exerted on the touchpad module is eliminated, the swinging structure is swung away from the base plate by using the bending line as the fulcrum in response to a restoring force of the sheet-like elastic element. While the swinging structure is swung away from the base plate, the touch member is swung away from the base plate by using the supporting structure as the fulcrum, so that the switch is separated from the triggering part.

In an embodiment, the touchpad module further includes a first adhesive layer, and the first adhesive layer is arranged between the sheet-like elastic element and the touch member. The first adhesive layer is extended along the extension direction to cover the swinging structure of the sheet-like elastic element. The swinging structure is attached on the touch member through the first adhesive layer.

In an embodiment, the touch member includes a circuit board and a covering plate. The covering plate is located over the circuit board. The switch is disposed on the circuit board. The swinging structure is attached on the circuit board through the first adhesive layer.

In an embodiment, the first adhesive layer includes plural hollow regions, and the plural hollow regions are discretely arranged along the extension direction. The plural hollow regions are aligned with the corresponding fixing structures of the sheet-like elastic element.

In an embodiment, the swinging structure of the sheet-like elastic element includes a first segment and plural second segments. The first segment is extended from the bending line in a direction away from the fixing structures and arranged between the base plate and the touch member. The plural second segments are extended from the bending line in a direction toward the fixing structures and arranged between the supporting structure and the touch member.

In an embodiment, the plural vacant spaces and the plural fixing structures of the sheet-like elastic element are arranged between the supporting structure and the touch member. Each vacant space is arranged between the adjacent fixing structure and the adjacent second segment.

In an embodiment, the supporting structure is protruded from the base plate in a direction toward the touch member, and the supporting structure is integrally formed with the base plate.

In an embodiment, the fixing structures of the sheet-like elastic element are fixed on the supporting structure by a laser welding process.

In an embodiment, the touchpad module further includes a second adhesive layer. The second adhesive layer is arranged between the base plate and the supporting structure. The supporting structure is attached on the base plate through the second adhesive layer.

In an embodiment, the touchpad module further includes at least one fastening element, and the base plate is fixed on the fixing frame through the at least one fastening element.

In accordance with another aspect of the present invention, a computing device is provided. The computing device includes a casing, a processor and a touchpad module. The fixing frame is concavely formed in the casing. The processor is disposed within the casing. The touchpad module is disposed within the casing and electrically connected with the processor. The touchpad module includes a touch member, a base plate, a switch, a supporting structure and a sheet-like elastic element. The touch member is disposed within the fixing frame. The touch member includes a first lateral side and a second lateral side, which are opposed to each other. The base plate is disposed within the fixing frame, and includes a triggering part. The base plate and the touch member are opposed to each other. The switch is disposed on the touch member and aligned with the triggering part of the base plate. The supporting structure is arranged between the base plate and the touch member. The sheet-like elastic element is located under the touch member and extended along an extension direction. The extension direction is in parallel with an extension line from the first lateral side of the touch member to the second lateral side of the touch member. The sheet-like elastic element includes plural vacant spaces. The plural vacant spaces are discretely arranged along the extension direction. The sheet-like elastic element is divided into a swinging structure and plural fixing structures by the plural vacant spaces. A bending line passes through junctions between the fixing structures and the swinging structure. When an external force is exerted on the touchpad module, the touch member is swung toward the base plate by using the supporting structure as a fulcrum, so that the switch is contacted with the triggering part. While the touch member is swung toward the base plate, the swinging structure is swung toward the base plate by using the bending line as the fulcrum.

From the above descriptions, the present invention provides the touchpad module and the computing device with the touchpad module. The elastic element of the touchpad module is the sheet-like elastic element. The sheet-like elastic element comprises plural vacant spaces, which are discretely arranged. The sheet-like elastic element is divided into a swinging structure and plural fixing structures by these vacant spaces. The shape of the first adhesive layer matches the shape of the swinging structure. Due to the first adhesive layer, the contact area between the sheet-like elastic element and the touch member is largely increased. Due to this structural design, the swinging action of the touch member with respect to the base plate by using the supporting structure as the fulcrum is stable (i.e., not aslant). Since the elastic element has the sheet-like structure, the desired number of fixing structures can be created by cutting the sheet-like elastic element. Consequently, the tactile feel of operating the touchpad module and the overall structural strength of the touchpad module are enhanced. Moreover, since the structural design of the touchpad module is simple and the process of assembling the components of the touchpad module is easy, the fabricating cost is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
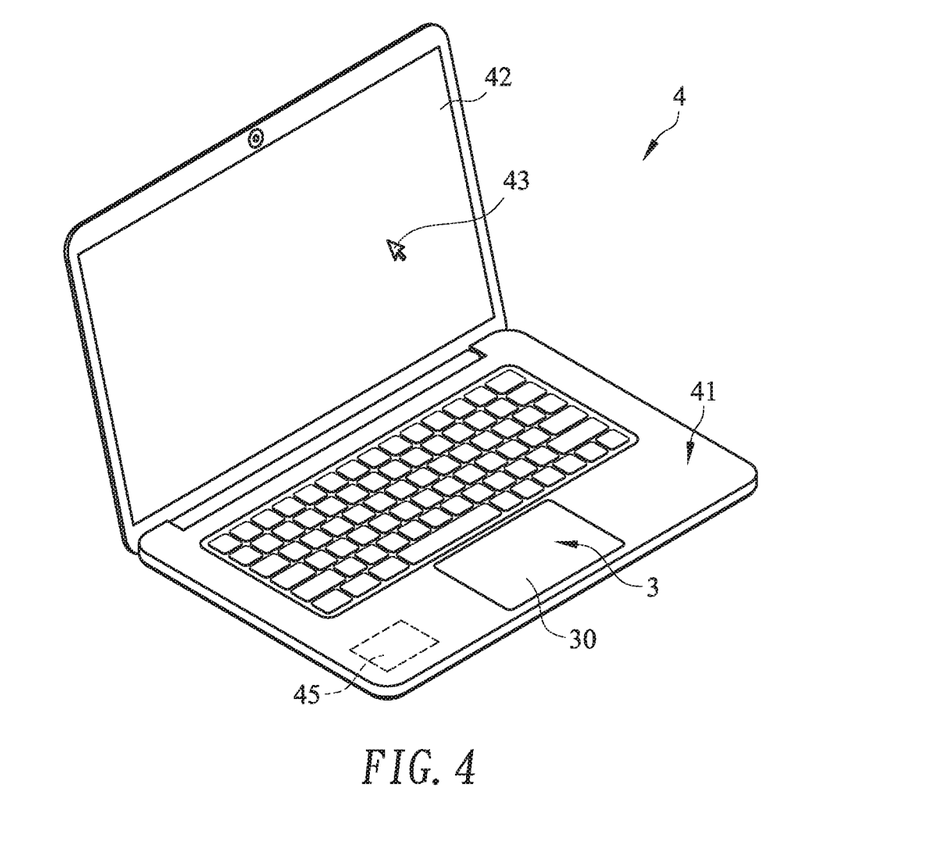
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed by the user's finger, the computing device 4 executes a specified function.

The other structure of the touchpad module 3 will be described in more details as follows.

Figure 5:
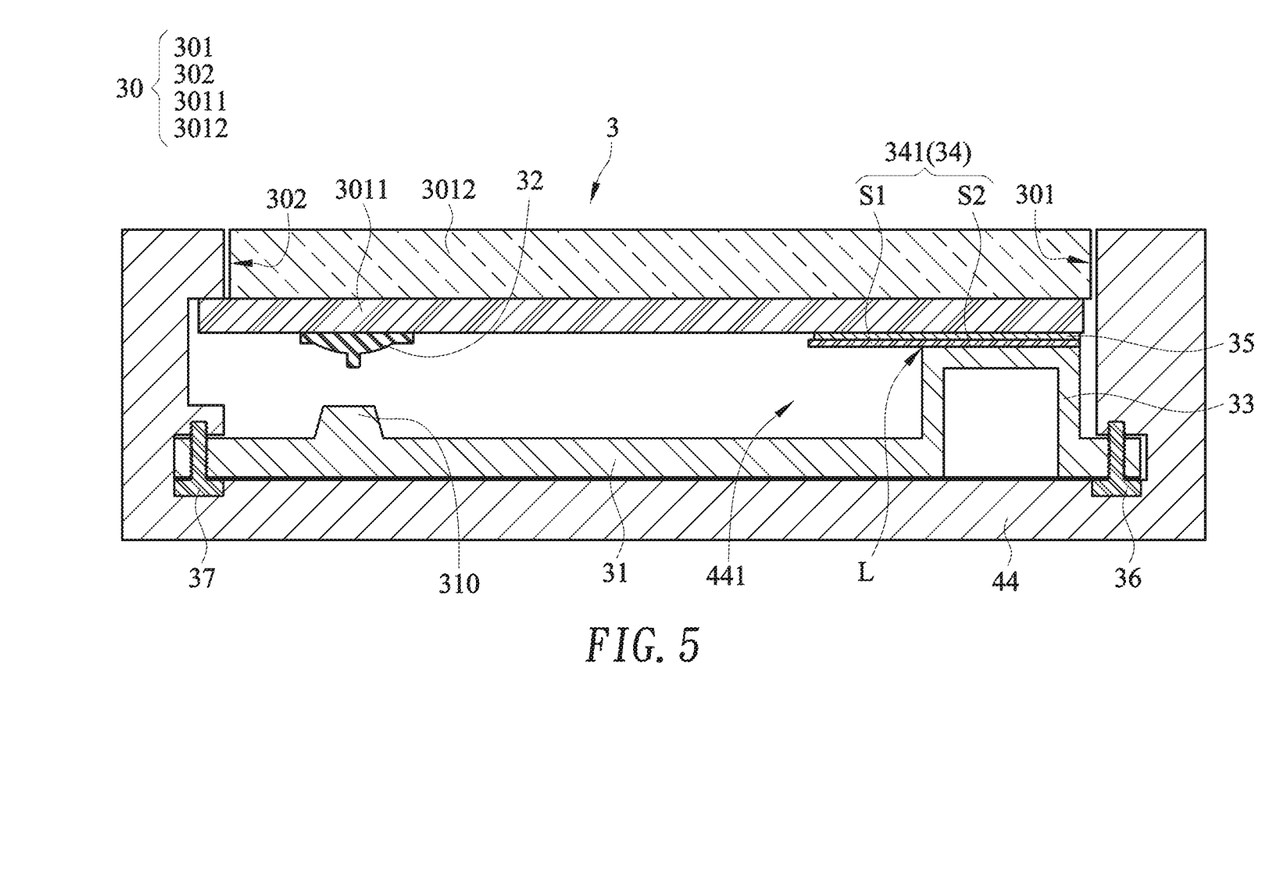
FIG. 5 is a schematic cross-sectional view illustrating portions of the fixing frame and the touchpad module of the computing device as shown in FIG. 4.
Figure 6:
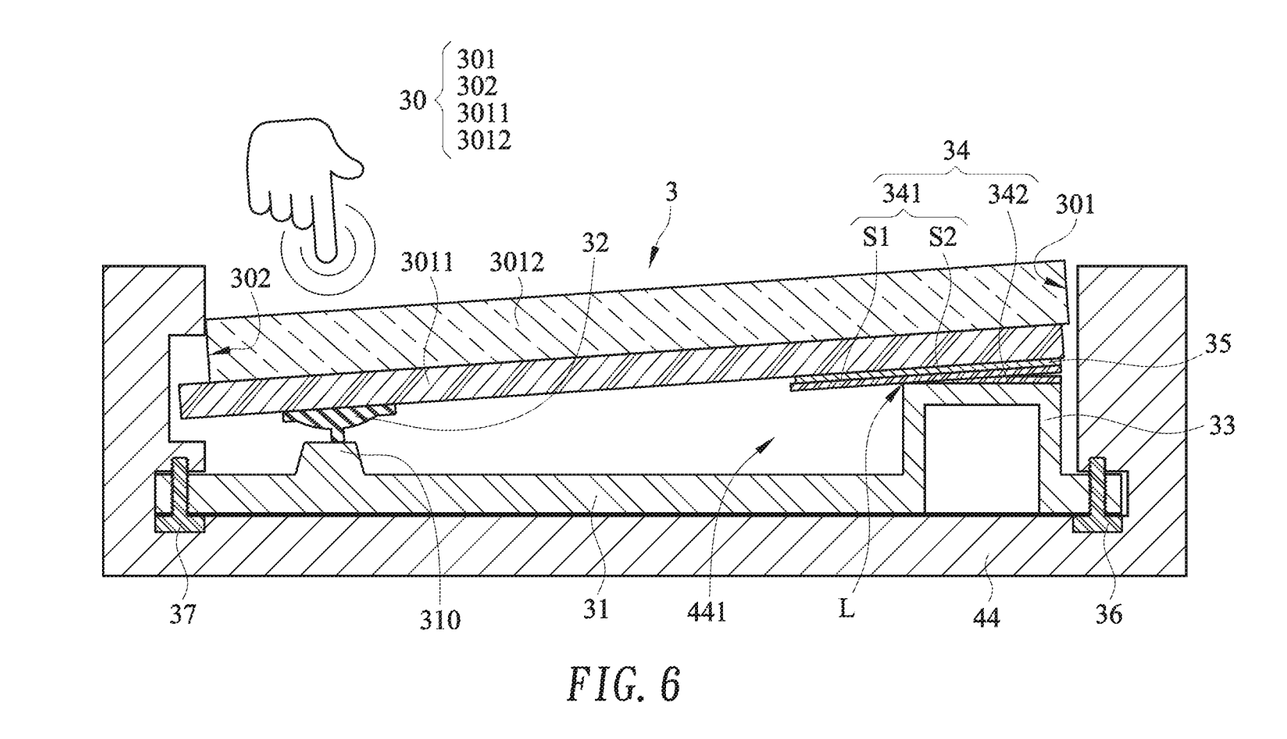
FIG. 6 is a schematic cross-sectional view illustrating the fixing frame and the touchpad module as shown in FIG. 5, in which an external force is exerted on the touchpad module.
Figure 7:
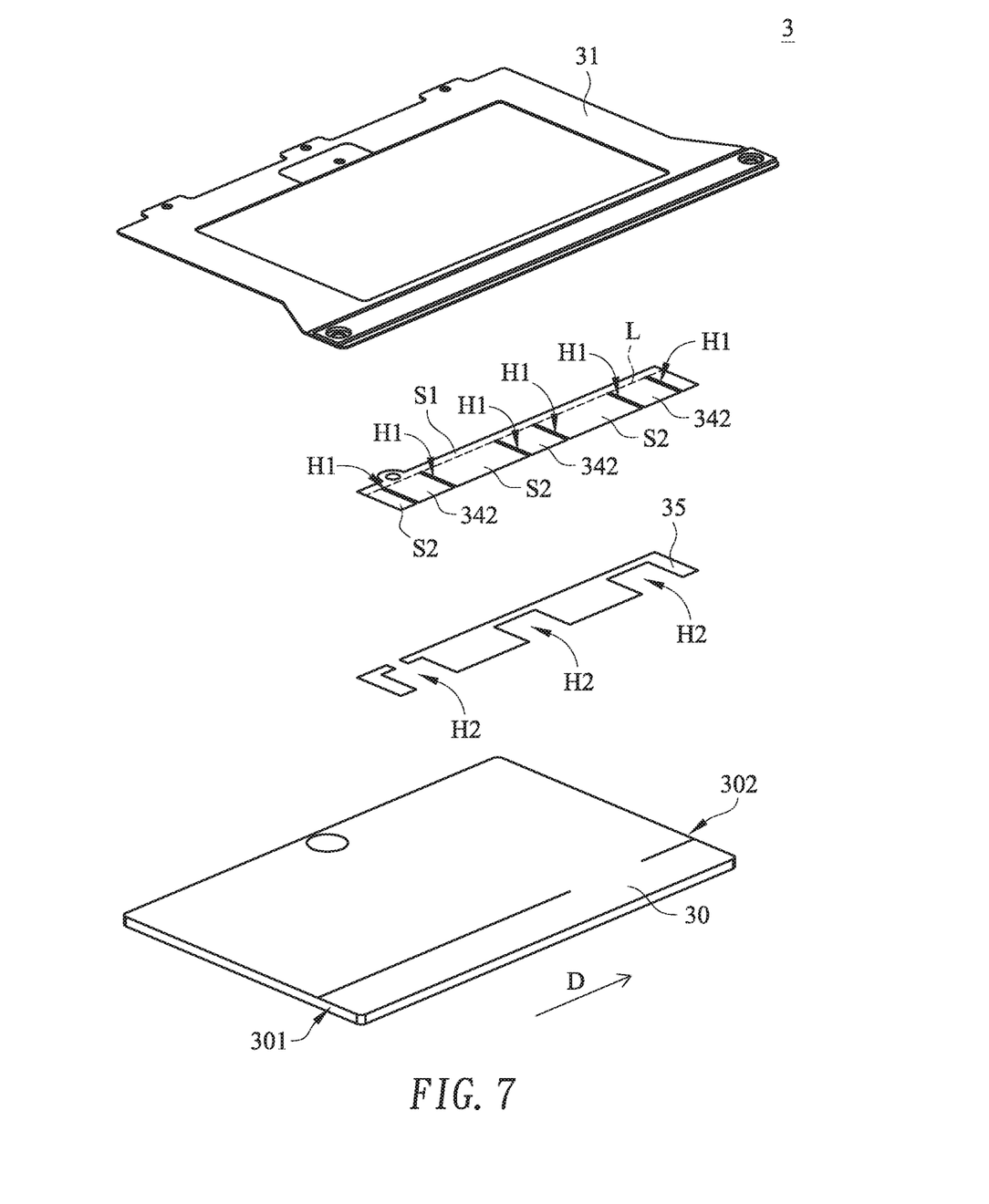
FIG. 7 is a schematic exploded view illustrating the touchpad module as shown in FIG. 5 and taken along a rear viewpoint.
Figure 8:
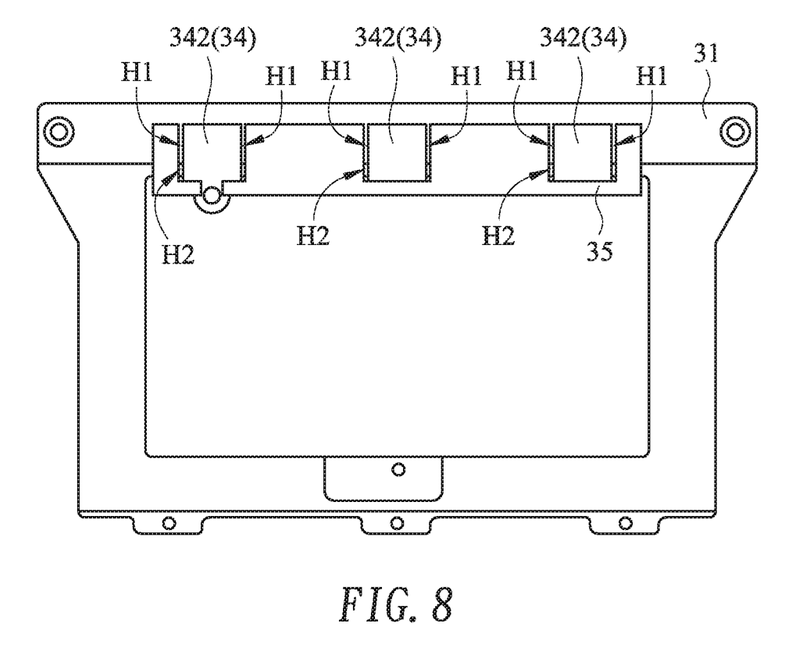
FIG. 8 is a schematic top view illustrating the combination of the base plate, the sheet-like elastic element and the first adhesive layer of the touchpad module as shown in FIG. 7.

Please refer to FIGS. 5, 6, 7 and 8. FIG. 5 is a schematic cross-sectional view illustrating portions of the fixing frame and the touchpad module of the computing device as shown in FIG. 4. FIG. 6 is a schematic cross-sectional view illustrating the fixing frame and the touchpad module as shown in FIG. 5, in which an external force is exerted on the touchpad module. FIG. 7 is a schematic exploded view illustrating the touchpad module as shown in FIG. 5 and taken along a rear viewpoint. FIG. 8 is a schematic top view illustrating the combination of the base plate, the sheet-like elastic element and the first adhesive layer of the touchpad module as shown in FIG. 7.

As shown in FIGS. 5, 6 and 7, the fixing frame 44 of the computing device 4 comprises an accommodation space 441. The touchpad module 3 is accommodated within the accommodation space 441. In an embodiment, the touchpad module 3 comprises a touch member 30, a base plate 31, a switch 32, a supporting structure 33 and a sheet-like elastic element 34. The touch member 30 is disposed within the fixing frame 44. The touch member 30 comprises a first lateral side 301 and a second lateral side 302. The first lateral side 301 and the second lateral side 302 are opposed to each other. The base plate 31 is disposed within the fixing frame 44. Moreover, the touch member 30 and the base plate 31 are opposed to each other. The base plate 31 comprises a triggering part 310. The switch 32 is disposed on the touch member 30 and aligned with the triggering part 310 of the base plate 31. That is, the switch 32 is disposed on a surface of the touch member 30 that faces the base plate 31. The supporting structure 33 is arranged between the touch member 30 and the base plate 31. Moreover, the supporting structure 33 is located beside a first lateral side of the fixing frame 44, and the triggering part 310 of the base plate 31 is located beside a second lateral side of the fixing frame 44. The supporting structure 33 is protruded from the base plate 31 in the direction toward the touch member 30. In this embodiment, the supporting structure 33 is integrally formed with the base plate 31. That is, the supporting structure 33 is formed by bending a portion of the base plate 31 toward the touch member 30. It is noted that the formation of the supporting structure 33 is not restricted. The sheet-like elastic element 34 is located under the touch member 30. That is, the sheet-like elastic element 34 is arranged between the touch member 30 and the supporting structure 33. The sheet-like elastic element 34 is extended along an extension direction D. When the touch member 30 is not pressed down, the extension direction D is substantially in parallel with the extension line from the first lateral side 301 of the touch member 30 to the second lateral side 302 of the touch member 30. In an embodiment, the sheet-like elastic element 34 comprises plural vacant spaces H1 along the extension direction D. These vacant spaces H1 are discretely arranged. The sheet-like elastic element 34 is divided into a swinging structure 341 and plural fixing structures 342 by these vacant spaces H1. Moreover, a bending line L passes through the junctions between the fixing structures 342 and the swinging structure 341.

Please refer to FIGS. 4, 5 and 6. When an external force is exerted on the touchpad module 3, the touch member 30 is swung relative to the base plate 31 by using the supporting structure 33 as a fulcrum. As the touch member 30 is swung, the switch 32 on the touch member 30 is contacted with the triggering part 310 of the base plate 31 to issue an enabling signal to the computing device 4. According to the enabling signal, the computing device 4 executes a corresponding function. The detailed operations of the touchpad module 3 will be described later.

Please refer to FIGS. 5, 6, 7 and 8. In an embodiment, the touchpad module 3 further comprises a first adhesive layer 35. The first adhesive layer 35 is arranged between the sheet-like elastic element 34 and the touch member 30. The first adhesive layer 35 is also extended along the extension direction D to cover the swinging structure 341 of the sheet-like elastic element 34. That is, the first adhesive layer 35 covers the swinging structure 341, but does not cover the fixing structures 342. The swinging structure 341 is attached on the touch member 30 through the first adhesive layer 35. In an embodiment, the first adhesive layer 35 comprises plural hollow regions H2 along the extension direction D. These hollow regions H2 are discretely arranged. When the swinging structure 341 of the sheet-like elastic element 34 is covered by the first adhesive layer 35, the plural hollow regions H2 are aligned with the corresponding fixing structures 342 of the sheet-like elastic element 34. That is, when the swinging structure 341 of the sheet-like elastic element 34 is covered by the first adhesive layer 35, the plural fixing structures 342 are exposed through the corresponding hollow regions H2 (see FIG. 8). Preferably but not exclusively, the first adhesive layer 35 is a pressure sensitive adhesives (PSA). In an embodiment, the fixing structures 342 of the sheet-like elastic element 34 are fixed on the supporting structure 33 by a laser welding process. Since the supporting structure 33 is integrally formed with the base plate 31, it may be considered that the sheet-like elastic element 34 is directly fixed on the base plate 31 by the laser welding process.

In the above embodiment, the appearance and shape of the sheet-like elastic element 34 are specially designed such that the laser welding process can be directly performed on the sheet-like elastic element 34. Since the sheet-like elastic element 34 and the base plate 31 can be fixed on each other without the need of additionally using bonding agent, the fabricating cost of the touchpad module is reduced. Moreover, due to the appearance and shape of the sheet-like elastic element 34, the contact area between the sheet-like elastic element 34 and the touch member 30 (i.e., the contact area between the swinging structure 341 and the touch member 30) is increased. In such way, the stability of switching the touch member 30 relative to the base plate 31 is enhanced, and the structural strength of the touchpad module 3 is largely increased.

Please refer to FIGS. 5 and 8. In this embodiment, the swinging structure 341 of the sheet-like elastic element 34 comprises a first segment S1 and plural second segments S2. The first segment S1 is extended from the bending line L in the direction away from the fixing structures 342. That is, the first segment S1 is arranged between the touch member 30 and the base plate 31. The second segments S2 are extended from the bending line L in the direction toward the fixing structures 342. That is, the second segments S2 are arranged between the supporting structure 33 and the touch member 30. The vacant spaces H1 of the sheet-like elastic element 3 and the plural fixing structures 342 are arranged between the supporting structure 33 and the touch member 30. Moreover, each vacant space H1 is arranged between the adjacent fixing structure 342 and the adjacent second segment S2. In this embodiment, six vacant spaces H1 are formed in the sheet-like elastic element 34. Moreover, the sheet-like elastic element 34 comprises a swinging structure 341 and three fixing structures 342, wherein the swinging structure 341 comprises one first segment S1 and four second segments S2. In other words, these components are arranged in the following sequence: the second segment S2, the vacant space H1, the fixing structure 342, the vacant space H1, the second segment S2, the vacant space H1, the fixing structure 342, the vacant space H1, the second segment S2, the vacant space H1, the fixing structure 342, the vacant space H1 and second segment S2.

Please refer to FIGS. 5 and 6 again. In this embodiment, the touch member 30 comprises a circuit board 3011 and a covering plate 3012. The covering plate 3012 is located over the circuit board 3011. Moreover, the covering plate 3012 and the circuit board 3011 are combined together. In this embodiment, the switch 32 is disposed on a first edge of a surface of the circuit board 3011 that faces the base plate 31. Moreover, through the first adhesive layer 35, the swinging structure 341 of the sheet-like elastic element 34 is attached on a second edge of the surface of the circuit board 3011 that faces the base plate 31. Preferably but not exclusively, the covering plate 3012 is made of glass. It is noted that the material of the covering plate 3012 may be varied according to the practical requirements.

Please refer to FIGS. 5 and 6 again. The touchpad module 3 further comprises at least one fastening element (e.g., two fastening elements). In this embodiment, the touchpad module 3 comprises a first fastening element 36 and a second fastening element 37. In this embodiment, the base plate 31 is fixed on the fixing frame 44 of the computing device 4 through the first fastening element 36 and the second fastening element 37. It is noted that the number of the at least one fastening element is not restricted and may be varied according to the practical requirements.

The operations of the touchpad module 3 will be described in more details as follows.

Please refer to FIG. 6. When an external force is exerted on the touchpad module 3, the touch member 30 of the touchpad module 3 is swung toward the base plate 31 by using the supporting structure 33 as a fulcrum. Consequently, the switch 32 on the touch member 30 is contacted with the triggering part 310 of the base plate 31. As the touch member 30 is swung, the swinging structure 341 is correspondingly swung toward the base plate 31 by using the bending line L as the fulcrum.

Please refer to FIG. 5 again. The external force exerted on the touchpad module 3 is eliminated. In response to a restoring force of the sheet-like elastic element 34, the swinging structure 341 of the sheet-like elastic element 34 is swung away from the base plate 31 by using the bending line L as the fulcrum. Under this circumstance, the touch member 30 is swung away from the base plate 31 by using the supporting structure 33 as the fulcrum, and the switch 32 on the touch member 30 is separated from the triggering part 310 of the base plate 31.

Figure 9:
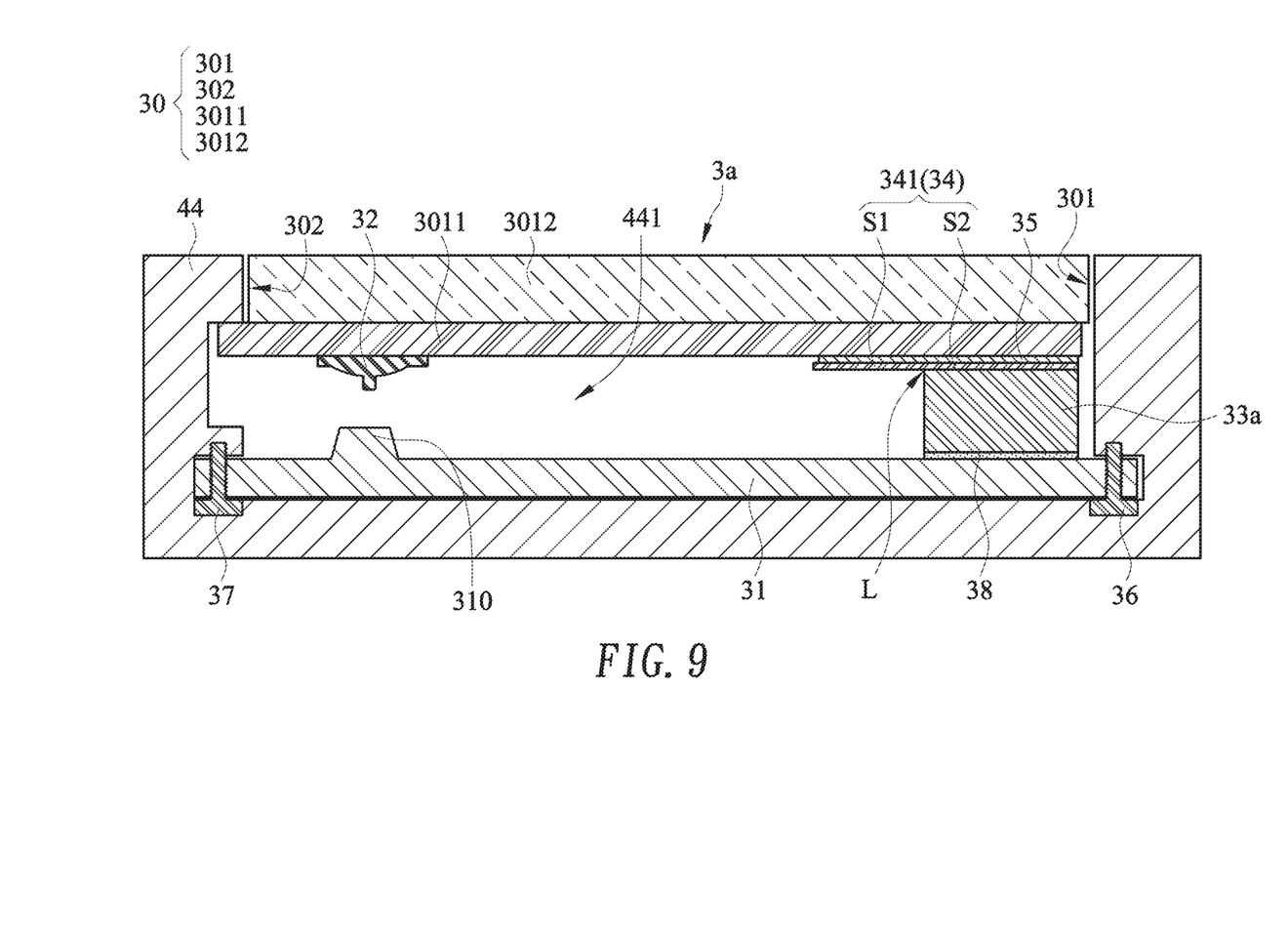
FIG. 9 is a schematic cross-sectional view illustrating portions of a fixing frame and a touchpad module of a computing device according to another embodiment of the present invention.

FIG. 9 is a schematic cross-sectional view illustrating portions of a fixing frame and a touchpad module of a computing device according to another embodiment of the present invention. In comparison with the touchpad module 3 as shown in FIGS. 5 to 8, the supporting structure 33a and the base plate 31 of the touchpad module 3a of this embodiment are two individual components. The fixing structures 342 of the sheet-like elastic element 34 are fixed on the supporting structure 33a by a laser welding process. Moreover, the touchpad module 3a further comprises a second adhesive layer 38. The second adhesive layer 38 is arranged between the base plate 31 and the supporting structure 33a. The supporting structure 33a is attached on the base plate 31 through the second adhesive layer 38. The other components of the touchpad module 3a are similar to those of the touchpad module 3, and are not redundantly described herein.

From the above descriptions, the present invention provides the touchpad module and the computing device with the touchpad module. The elastic element of the touchpad module is the sheet-like elastic element. The sheet-like elastic element comprises plural vacant spaces, which are discretely arranged. The sheet-like elastic element is divided into a swinging structure and plural fixing structures by these vacant spaces. The shape of the first adhesive layer matches the shape of the swinging structure. Due to the first adhesive layer, the contact area between the sheet-like elastic element and the touch member is largely increased. Due to this structural design, the swinging action of the touch member with respect to the base plate by using the supporting structure as the fulcrum is stable (i.e., not aslant). Since the elastic element has the sheet-like structure, the desired number of fixing structures can be created by cutting the sheet-like elastic element. Consequently, the tactile feel of operating the touchpad module and the overall structural strength of the touchpad module are enhanced. Moreover, since the structural design of the touchpad module is simple and the process of assembling the components of the touchpad module is easy, the fabricating cost is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the computing device comprising a fixing frame, the touchpad module comprising:
   a touch member disposed within the fixing frame, wherein the touch member comprises a first lateral side and a second lateral side, which are opposed to each other;
   a base plate disposed within the fixing frame, and comprising a triggering part, wherein the base plate and the touch member are opposed to each other;
   a switch disposed on the touch member and aligned with the triggering part of the base plate;
   a supporting structure arranged between the base plate and the touch member; and
   a sheet-like elastic element located under the touch member and extended along an extension direction, wherein the extension direction is in parallel with an extension line from the first lateral side of the touch member to the second lateral side of the touch member, the sheet-like elastic element comprises plural vacant spaces, the plural vacant spaces are discretely arranged along the extension direction, the sheet-like elastic element is divided into a swinging structure and plural fixing structures by the plural vacant spaces, and a bending line passes through junctions between the fixing structures and the swinging structure;
   wherein when an external force is exerted on the touchpad module, the touch member is swung toward the base plate by using the supporting structure as a fulcrum, so that the switch is contacted with the triggering part, wherein while the touch member is swung toward the base plate, the swinging structure is swung toward the base plate by using the bending line as the fulcrum.

2. The touchpad module according to claim 1, wherein when the external force exerted on the touchpad module is eliminated, the swinging structure is swung away from the base plate by using the bending line as the fulcrum in response to a restoring force of the sheet-like elastic element, wherein while the swinging structure is swung away from the base plate, the touch member is swung away from the base plate by using the supporting structure as the fulcrum, so that the switch is separated from the triggering part.

3. The touchpad module according to claim 1, wherein the touchpad module further comprises a first adhesive layer, and the first adhesive layer is arranged between the sheet-like elastic element and the touch member, wherein the first adhesive layer is extended along the extension direction to cover the swinging structure of the sheet-like elastic element, and the swinging structure is attached on the touch member through the first adhesive layer.

4. The touchpad module according to claim 3, wherein the touch member comprises a circuit board and a covering plate, wherein the covering plate is located over the circuit board, the switch is disposed on the circuit board, and the swinging structure is attached on the circuit board through the first adhesive layer.

5. The touchpad module according to claim 3, wherein the first adhesive layer comprises plural hollow regions, and the plural hollow regions are discretely arranged along the extension direction, wherein the plural hollow regions are aligned with the corresponding fixing structures of the sheet-like elastic element.

6. The touchpad module according to claim 1, wherein the swinging structure of the sheet-like elastic element comprises a first segment and plural second segments, wherein the first segment is extended from the bending line in a direction away from the fixing structures and arranged between the base plate and the touch member, wherein the plural second segments are extended from the bending line in a direction toward the fixing structures and arranged between the supporting structure and the touch member.

7. The touchpad module according to claim 6, wherein the plural vacant spaces and the plural fixing structures of the sheet-like elastic element are arranged between the supporting structure and the touch member, wherein each vacant space is arranged between the adjacent fixing structure and the adjacent second segment.

8. The touchpad module according to claim 1, wherein the supporting structure is protruded from the base plate in a direction toward the touch member, and the supporting structure is integrally formed with the base plate.

9. The touch pad module according to claim 1, wherein the fixing structures of the sheet-like elastic element are fixed on the supporting structure by a laser welding process.

10. The touchpad module according to claim 1, wherein the touchpad module further comprises a second adhesive layer, wherein the second adhesive layer is arranged between the base plate and the supporting structure, and the supporting structure is attached on the base plate through the second adhesive layer.

11. The touchpad module according to claim 1, wherein the touchpad module further comprises at least one fastening element, and the base plate is fixed on the fixing frame through the at least one fastening element.

12. A computing device, comprising:
   a casing, wherein a fixing frame is concavely formed in the casing;
   a processor disposed within the casing; and
   a touchpad module disposed within the casing and electrically connected with the processor, wherein the touchpad module comprises:
      a touch member disposed within the fixing frame, wherein the touch member comprises a first lateral side and a second lateral side, which are opposed to each other;
      a base plate disposed within the fixing frame, and comprising a triggering part, wherein the base plate and the touch member are opposed to each other;
      a switch disposed on the touch member and aligned with the triggering part of the base plate;
      a supporting structure arranged between the base plate and the touch member; and
      a sheet-like elastic element located under the touch member and extended along an extension direction, wherein the extension direction is in parallel with an extension line from the first lateral side of the touch member to the second lateral side of the touch member, the sheet-like elastic element comprises plural vacant spaces, the plural vacant spaces are discretely arranged along the extension direction, the sheet-like elastic element is divided into a swinging structure and plural fixing structures by the plural vacant spaces, and a bending line passes through junctions between the fixing structures and the swinging structure;
   wherein when an external force is exerted on the touchpad module, the touch member is swung toward the base plate by using the supporting structure as a fulcrum, so that the switch is contacted with the triggering part, wherein while the touch member is swung toward the base plate, the swinging structure is swung toward the base plate by using the bending line as the fulcrum.

\* \* \* \* \*